United States Patent
Chorkey

[11] 3,838,850
[45] Oct. 1, 1974

[54] IMPACT NOISE SUPPRESSOR
[75] Inventor: William J. Chorkey, Farmington, Mich.
[73] Assignee: Ace Controls, Inc., Farmington, Mich.
[22] Filed: Dec. 27, 1972
[21] Appl. No.: 318,924

[52] U.S. Cl. .............................................. 267/141
[51] Int. Cl. .............................................. F16l 7/12
[58] Field of Search ........... 267/140, 142, 152, 153, 267/35 V; 188/287

[56] References Cited
UNITED STATES PATENTS
| | | | |
|---|---|---|---|
| 1,029,462 | 6/1912 | Rife | 267/35 |
| 3,230,880 | 1/1966 | Beaver | 267/153 |
| 3,305,227 | 2/1967 | Henley | 267/153 |
| 3,478,857 | 11/1969 | Linker | 267/153 |

*Primary Examiner*—James B. Marbert
*Attorney, Agent, or Firm*—Robert G. Mentag

[57] ABSTRACT

A resilient impact noise and shock suppressor for use on an end button fixed on the load receiving end of the piston rod of a shock absorber. The suppressor includes a body portion adapted to be releasably mounted on said end button, and an integral nose portion formed on the body portion and having a frustro-conical outer periphery and a flat load receiving end surface which is perpendicular to the longitudinal axis of the suppressor.

2 Claims, 3 Drawing Figures

PATENTED OCT 1 1974 3,838,850

IMPACT NOISE SUPPRESSOR

SUMMARY OF THE INVENTION

This invention relates generally to shock absorbers, and more particularly, to a novel and improved impact noise and shock suppressor for use on a shock absorber.

It is an important object of the present invention to provide an impact noise suppressor which is adapted to be releasably mounted on the impact receiving button normally carried on the outer end of the piston rod of a shock absorber.

It is another object of the present invention to provide a novel and improved impact noise suppressor for use on the load receiving end of a shock absorber piston rod, and which is simple and compact in structure, economical to manufacture, and efficient in operation.

It is a further object of the present invention to provide a novel and improved impact noise suppressor for use on the load receiving end of the piston rod of a shock absorber, and which includes a body portion adapted to be releasably mounted on said piston rod, and an integral nose portion formed on the body portion and having a frustro-conical outer periphery and a flat load receiving end surface which is perpendicular to the longitudinal axis of the suppressor.

Other objects, features and advantages of this invention will be apparent from the following detailed description, appended claims and the accompanying drawing.

DETAILED DESCRIPTION OF THE PREFERRED EMBODIMENT

Figure 1:
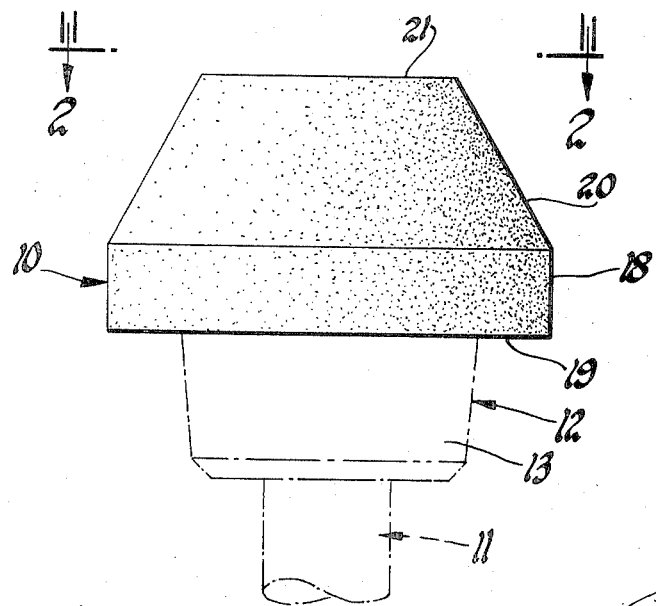
FIG. 1 is a side elevational view of an impact noise suppressor made in accordance with the principles of the present invention.
Figure 2:
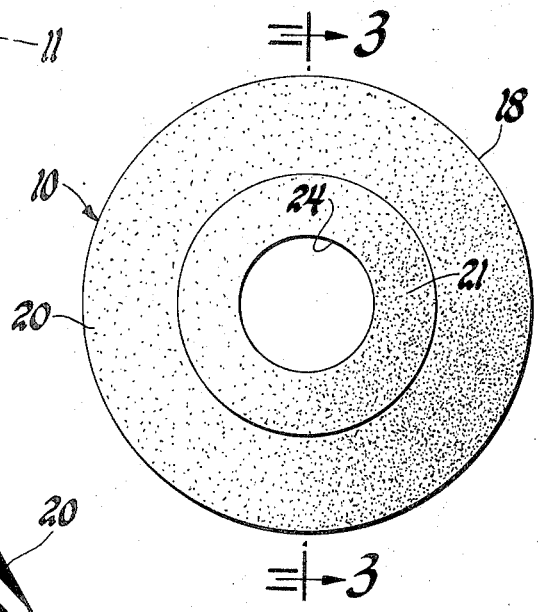
FIG. 2 is a top plan view of the structure illustrated in FIG. 1, taken along the line 2—2 thereof, and looking in the direction of the arrows.

Referring now to the drawing, the numeral 10 generally designates an impact noise suppressor made in accordance with the principles of the present invention. The numeral 11 generally designates the piston rod of a conventional shock absorber as, for example, the shock absorber illustrated in U.S. Pat. No. 3,168,168. The numeral 12 generally designates a piston rod end button which is operatively mounted on the outer end of the rod 11 for receiving a shock load. The button 12 is of a conventional design and includes a body 13 and a head 14 which extends laterally outward from the outer periphery of the body 13, and which is provided on its upper face with a convex load receiving surface 15. The button body 13 is provided with an inwardly extended axial hole 16 in which is received the outer end of the piston rod 11. The button 12 is releasably secured to the piston rod 11 by any suitable means, as by a suitable machine screw 17.

The impact noise suppressor 10 includes a cylindrical body portion 18 which is provided with a flat lower end 19 that is perpendicular to the periphery of the body portion 18. Integrally formed on the top end of the impact noise suppressor body portion 18 is a nose or load engaging portion 20 which extends upwardly from the body portion 18 for a distance of about twice the height of the body portion 18. The outer periphery of the nose portion 20 is frustro-conically shaped at any angle from the vertical. The upper face 21 of the nose portion 20 is perpendicular to the longitudinal axis of the suppressor.

Figure 3:
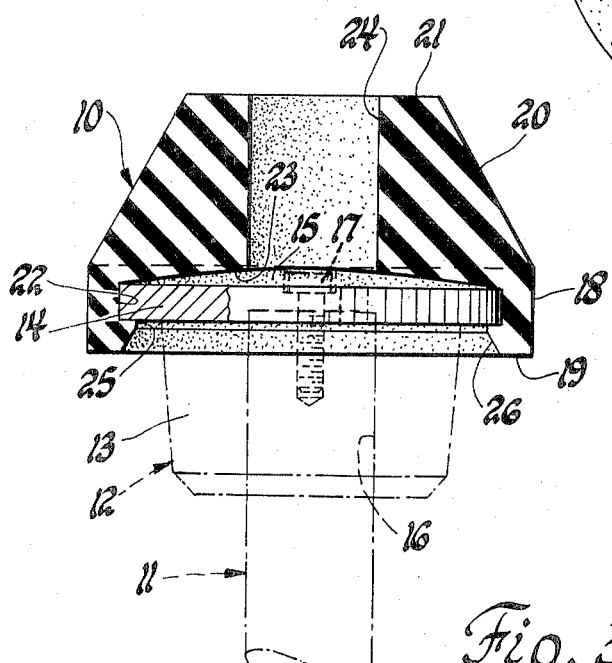
FIG. 3 is an elevational section view of the structure illustrated in FIG. 2, taken along the line 3—3 thereof, and looking in the direction of the arrows.

As best seen in FIG. 3, the suppressor 10 is provided in the body portion thereof with a cylindrical recess 22 which is adapted to receive the head 14 of the button 12. The inner end surface 23 of the recess 22 is shaped concavely upwards so as to be complementary to the convex upper face 15 of the button 12. The suppressor 10 is provided with an axial bore 24 which extends inwardly from the upper end 21 and which communicates at its inner end with the recess 22. The recess 22 communicates with a reduced diameter bore 25 on its lower side. The bore 25 in turn communicates with a bore 26 having an inwardly converging periphery and which extends to the lower end 19 of the suppressor 10.

The impact noise suppressor 10 may be made from any suitable resilient material, as for example, a suitable rubber or elastomeric material, such as polyurethane. The suppressor 10 is adapted to be snapped over the head portion 14 of the button 12 so as to seat said head portion 14 in the cylindrical recess 22. In use, a shock load which is to be absorbed by a shock absorber would engage the top end flat surface 21 of the suppressor 10. It is preferable that the moving load surface which strikes the noise suppressor top end 21 be flat and square to the longitudinal centerline axis of the noise suppressor 10 and be at least equal to the diameter of the suppressor body portion 18. It will be seen that the noise suppressor 10 functions to effectively deaden the sound of the contact between a shock absorber and a moving load.

While it will be apparent that the preferred embodiment of the invention herein disclosed is well calculated to fulfill the objects above stated, it will be appreciated that the invention is susceptible to modification, variation and change.

What is claimed is:

1. An elastomeric impact noise and shock suppressor for use on an end button fixed on the impact receiving end of the piston rod of a shock absorber comprising:

a. a body portion adapted to be mounted on said end button;
   b. an integral nose portion formed on the body portion and having a frustro-conical outer periphery and a flat load receiving end surface which is perpendicular to the longitudinal axis of the suppressor;
   c. said body portion being provided with a cylindrically shaped periphery and the frustro-conical periphery of said nose portion being formed at an angle directed radially inward from the longitudinally extended periphery of said body portion; and,
   d. said body portion being provided with an inwardly extended recess in the lower end thereof for the reception of said end button, said end button having a convex load receiving surface, and the inner end surface of said recess being shaped concavely upward and being seated on said end button convex load receiving surface.

2. An elastomeric impact noise suppressor as defined in claim 1, wherein:
 a. said nose portion is provided with an axial bore that extends inwardly from the upper end thereof and into communication with the recess in the body portion.

* * * * *